(12) United States Patent
Papadimitriou et al.

(10) Patent No.: US 7,240,010 B2
(45) Date of Patent: Jul. 3, 2007

(54) VOICE INTERACTION WITH AND CONTROL OF INSPECTION EQUIPMENT

(76) Inventors: Wanda G. Papadimitriou, P.O. Box 801496, Houston, TX (US) 77280; Stylianos Papadimitriou, P.O. Box 801496, Houston, TX (US) 77280

( * ) Notice: Subject to any disclaimer, the term of this patent is extended or adjusted under 35 U.S.C. 154(b) by 288 days.

(21) Appl. No.: 10/867,004

(22) Filed: Jun. 14, 2004

(65) Prior Publication Data

US 2005/0275558 A1    Dec. 15, 2005

(51) Int. Cl.
*G10L 15/00* (2006.01)
(52) U.S. Cl. .................. 704/275; 379/100.06
(58) Field of Classification Search ............ 704/275; 379/100.06
See application file for complete search history.

(56) References Cited

U.S. PATENT DOCUMENTS 4,825,385 A * 4/1989 Dolph et al. ................ 704/274
5,786,768 A * 7/1998 Chan et al. ................. 340/632
6,279,125 B1 * 8/2001 Klein .......................... 714/38
6,697,466 B2 * 2/2004 Howard et al. .......... 379/93.37
6,836,560 B2 * 12/2004 Emery ........................ 382/145

* cited by examiner

*Primary Examiner*—Daniel Abebe
(74) *Attorney, Agent, or Firm*—Kenneth L Nash

(57) ABSTRACT

The non-destructive inspection equipment is provided with voice interaction to interface with the inspector and/or operator who preferably controls the inspection equipment and the inspection process, at least in part, through the use of voice control and by receiving audio and/or video feedback from the inspection equipment. The overall inspection quality is preferably substantially improved when the inspector and/or operator can focus entirely on the material under inspection while maintaining full control of the inspection equipment and the inspection process. The inspection equipment and its interfaces are adapted and fine-tuned for interaction with humans, particularly in a harsh noise industrial environment. Further, the voice interaction preferably allows the inspector and/or operator to operate the inspection equipment while wearing gloves or with dirty hands as he/she will not need to constantly physically manipulate the inspection equipment.

53 Claims, 4 Drawing Sheets

VOICE CONTROL

VOICE CONTROL

VOICE INTERACTION WITH AND CONTROL OF INSPECTION EQUIPMENT

TECHNICAL FIELD

This invention relates, generally, to non-destructive inspection and inspection equipment, and more specifically, to providing voice interaction for the non-destructive inspection equipment and to the control of the non-destructive inspection equipment, in at least part, through voice interaction using voice control and receiving audio and/or video feedback from the inspection equipment.

BACKGROUND OF THE INVENTION

Since its inception in the early 1900s, the Non-Destructive Inspection (herein after referred to as "NDI") industry has utilized a variety of techniques and devices with the majority based on the well known and well documented techniques of magnetic flux leakage, magnetic particle, eddy-current, ultrasonic, radiation, such as x-ray and gamma ray, dye penetrant, and dimensional as well as visual and audible techniques. These techniques have been utilized alone or in combination with each other to address the specifics of the Material-Under-Inspection (herein after referred to as "MUI"). A list of typical MUI includes, but is not limited to engine components, rails, rolling stoke, oil country tubular goods, chemical plants, pipelines, bridges, structures, frames, cranes, aircraft, sea going vessels, drilling rigs, workover rigs, vessels, and the like.

Typically, the operation of the inspection equipment demands the undivided attention of the inspector while, at the same time, the inspection process may demand the inspector to focus on positioning and manipulating the inspection probe precisely or closely observing the MUI. A drawback of these techniques is that the inspection equipment must be physically separated a certain distance from the MUI thus the inspector cannot observe the MUI while operating the NDI equipment. Therefore, the overall inspection quality would be substantially improved if the inspector could focus entirely on the MUI while maintaining full control of the inspection equipment and the inspection process. This may be accomplished by adapting and fine-tuning the inspection equipment and its interface for interaction more adept to humans. Just as speech is a tool which allows communication while keeping one's hands free and one's attention focused on an elaborate task, adding a voice interface to the inspection equipment would preferably enable the inspector to focus on the MUI and the inspection process while maintaining full control of the inspection equipment. Further, the voice interaction preferably allows the inspector to operate the inspection equipment while wearing gloves or with dirty hands as he/she will not need to constantly physically manipulate the inspection equipment.

DETAILED DESCRIPTION OF EMBODIMENTS OF THE INVENTION

Typically, whether computerized or not, conventional inspection equipment is still controlled and adjusted through switches, keyboards, keypads, touch screens, potentiometers, variacs and other mechanical, electromechanical or electronic devices. The readouts preferably include, but are not limited to, lights, alphanumeric displays, graphic displays, chart recorders, printers, and the like. Preferably there may also be audible alarms including, but not limited to buzzers, beepers, sirens and the like to sound an alarm condition. However, to operate, read and interpret the output of the inspection equipment the inspector's attention is substantially focused entirely on the inspection equipment and not on the MUI. Voice interaction between the inspector and the inspection equipment preferably allows the inspector to focus on the MUI while at the same time controlling and monitoring the inspection process. Although various types of voice interaction are known, in the art, many problems still exist in an industrial setting due to the potential of an excessive noise environment. Thus, this invention preferably provides an inexpensive interaction device between the human inspector and the inspection equipment that can be easily incorporated in new inspection equipment as well as be easily retrofitted to existing inspection equipment.

Figure 1:
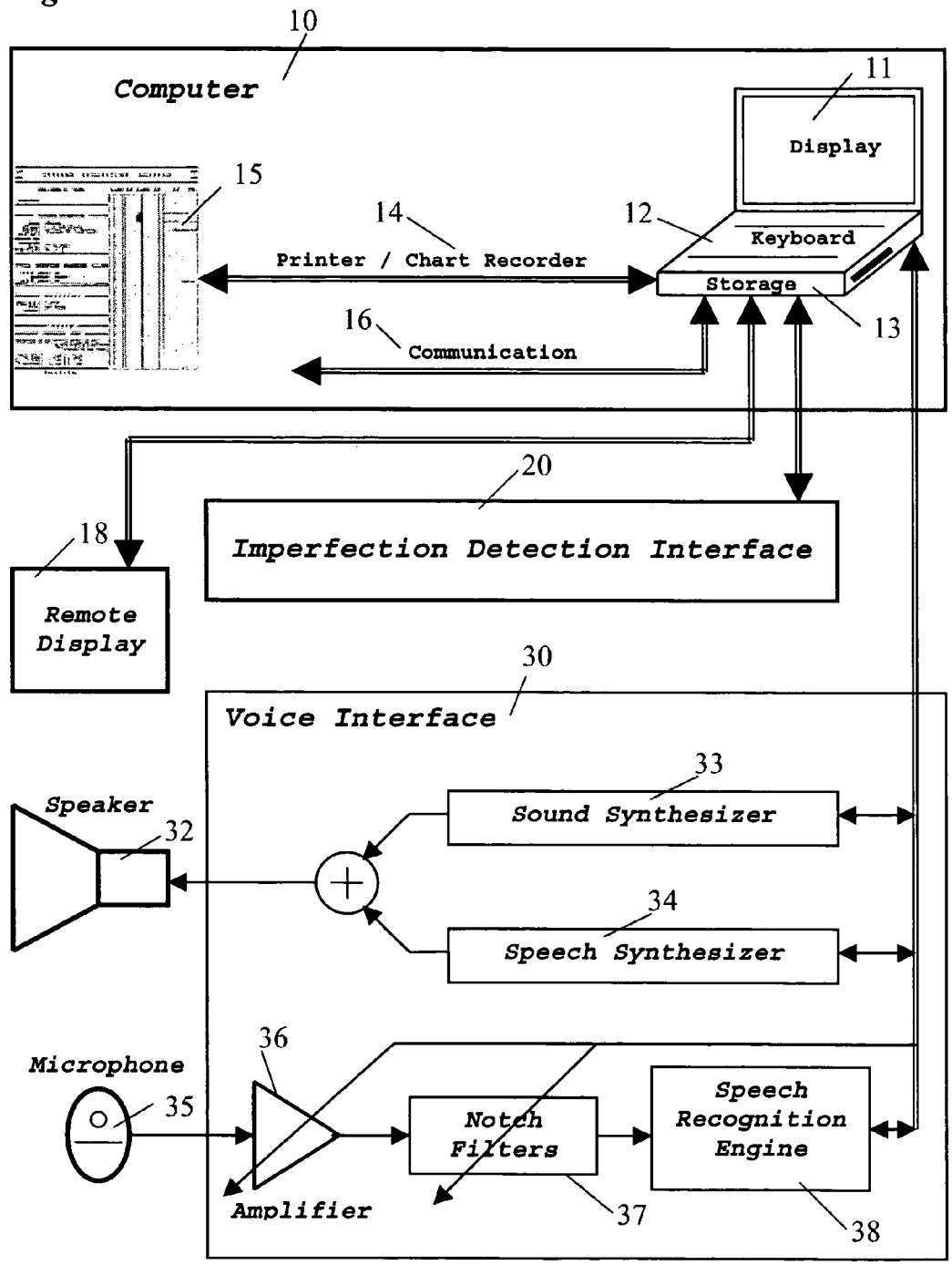
FIG. 1 is a block diagram of an inspection computer and the voice interface.

FIG. 1 is a block diagram of an inspection computer 10, an imperfection detection interface 20 and a voice interface 30. It should be understood that the inspection computer 10 may consist of a cluster of interconnected computers, not just a single physical computer. It should be further understood that the voice interface 30 may be implemented in hardware, software, or both and that the separate voice interface functions can also be implemented in different formats and their implementation may be carried out by a single computer or by the different computers in a cluster.

The computer 10 preferably further comprises a keyboard 12, display 11, and may also include a remote display 18 for allowing the inspector to both input commands and to visually view inspection results or other available data. The computer 10 may further comprises storage 13 capacity for storing and accessing the data. It should be appreciated that the stored data may comprise hard disks, floppy disks, compact discs, magnetic tapes, DVDs, memory, and other storage devices. It should be further appreciated that the stored data may comprise inspection data as well as other parameters including, but not limited to, temperatures, tubing speed and direction, location of the tubing inside the inspection head, internal pressure of the tubing, the wellhead pressure, the weight of the tubing hanging in the well, the flow rate of the fluid pumped through the tubing, and the volume of the fluid pumped. The computer 10 may transmit and receive data through at least one communication link 16 and may send data to a printer or chart recorder 14 for further visual confirmation of the inspection data 15 and other related information. The computer 10 preferably provides for data exchange between the voice interface engine 30.

Preferably, a voice command is received by the microphone 35 or other sound receiving device. The received sound is preferably amplified, such as by the amplifier 36. A feature of the embodiment is that the microphone amplifier 36 is followed by a bank of bandreject notch filters 37. Preferably, the inspector and/or the software can adjust the amplifier 36 gain and the center frequency of the notch filters 37. Since industrial noise is primarily machine generated, it typically consists of a single frequency and its harmonics. Therefore, adjustable notch filters 37 are well suited for the rejection of industrial noise. The notch filters 37 are preferably followed by the speech recognition engine 38. The data from the speech recognition engine 38 is preferably exchanged with the computer 10. Data from the computer 10 may be received by a speech synthesizer 34 and sound synthesizer 33. The data received by the speech synthesizer 33 is converted into speech and is preferably broadcast through a speaker 32. It should be understood that each synthesizer may be connected to a separate speaker or multiple speakers and that in a different embodiment the speech synthesizer 34 and the sound synthesizer 33 may be integrated into a single function, the speech and sound synthesizer.

It should be further understood that different inspection units may be programmed in different languages and/or with different commands but substantially performing the same overall function. The language capability of the inspection system may be configured to meet a wide variety of needs. Some examples of language capability, not to be viewed as limiting, may comprise recognizing speech in one language and responding in a different language; recognizing a change of language during the inspection process and responding in the changed language; providing manual language selection, which may include different input and response languages; providing automatic language selection based on pre-programmed instructions; simultaneously recognizing more than one language or simultaneously responding in more than one language; or any other desired combination therein.

Thus, in one embodiment the voice interface engine 30 will preferably be capable of recognizing languages other than English. Furthermore the voice response will also be capable of responding in the same language as the voice input by the inspector, with the language selection being made manually or automatically. In another embodiment the voice interface engine 30 will be capable of recognizing multiple languages simultaneously and responding in the language spoken to or responding in more than one language. Multiple language response may be carried out sequentially through the speech synthesizer 34, or in parallel by incorporating multiple speech synthesizers and speakers/earphones. It should be further understood that the microphone 35 and the speaker 32 may be incorporated into a conventional headset which can be worn by the inspector or can be in a variety of configurations so as to allow the inspector to conveniently give voice commands and receive voice or other sound based feedback. Still further, it should be appreciated that the voice source does not have to be the equipment operator or the inspector speaking directly into a microphone in communication with the inspection computer 10. It is foreseeable that voice commands may be via voice recordings, such as but not limited to, audio tapes or digital discs, they may be via telephones, radios, or other communication devices. Preferably, the remote display 18 may also be incorporated into the headset so as to allow the inspector to conveniently view inspection results or other available data.

Preferably, at least some degree of security and an assurance of safe operation, for the inspection equipment, is achieved by verifying the voiceprint of the inspector. Thus, the likelihood of a false command being carried out is minimized or substantially eliminated. It should be appreciated that similar to a fingerprint, an irisscan, or any other biometric, which can also be used for equipment security, a voiceprint identifies the unique characteristics of the inspector's voice. Thus, the voiceprint coupled with passwords will preferably create a substantially secure and false command immune operating environment.

The prior art does not present any solution for the conversion of the inspection signals, also referred to as "inspection traces", to speech or sound. The present invention utilizes psychoacoustic modeling to achieve this conversion and to drive the sound synthesizer 33 with the resulting sound being broadcast through the speaker 32 or a different speaker. Thus, the inspection signals may be listened to alone or in conjunction with the inspection unit comments and are of sufficient amount and quality as to enable the inspector to carry out the entire inspection process from a remote location, away from the inspection console and the typical inspection equipment readout instruments. Furthermore, the audible feedback is selected to maximize the amount of inspection information without overload or fatigue. This trace-to-sound conversion also addresses the dilemma of silence, which may occur when the inspection unit has nothing to report. Typically, in such a case, the inspector is not sure if the unit is silent due to the lack of imperfections or if it is silent because it stopped operating. Furthermore, certain MUI features such as, but not limited to, collars or welds can be observed visually and the synchronized audio response of the inspection system adds a degree of security to anyone listening. A wearable graphics display, such as an eyepiece, could serve as the remote display 18 to further enhance the inspection away from the console.

It should be appreciated that the inspection equipment can be configured in a variety of ways depending on the inspection goals, the surrounding environment, or the characteristics of the MUI. For instance, not intended as limiting, the inspection equipment could comprise systems with no voice or speech input or output but with a sound synthesizer 33 which may produce audible sounds to indicate operation and/or imperfection detection. Another embodiment may comprise voice and sound output but require no voice input, an example, not intended as limiting, may be a talking wall thickness probe. Another embodiment may require voice input and comprise a speech recognition engine 38 but no voice or sound output. For example, not intended as limiting, the voice commands may be limited to turning on or off a magnetic particle pump with the flow or the lack of flow being the feedback for the inspector. This does not just replace a simple foot-switch as it enables the actions of the inspector to be integrated into the overall inspection system. The inspector's observations may be recorded, both in audio and in digital format, and automatically become part of the time-stamped inspection record. Preferably, the inspector will detail his/her observations using benchmark words; thus, the observations will be readily tokenized to reduce the inspection record storage. Using a hexadecimal number as the token, 256 different tokens can be assigned. Each token may be followed by a numerical entry or a band to further characterize the token.

Yet a further embodiment may comprise a speech synthesizer 34, for voice output, but have no requirement for sound output or voice input. It should be further appreciated that such embodiments may still be computer controlled by separate computers, such as a personal computer or computers integral with the inspection equipment, wherein the inspection results may be stored in memory for subsequent retrieval and/or evaluation and/or may be output to devices such as conventional chart recorders, printers, or monitors. Still further it should be appreciated that the suppression, exclusion, or addition of the various features of the inspection equipment may be accomplished through excluding or adding hardware or through software controls.

Figure 2:
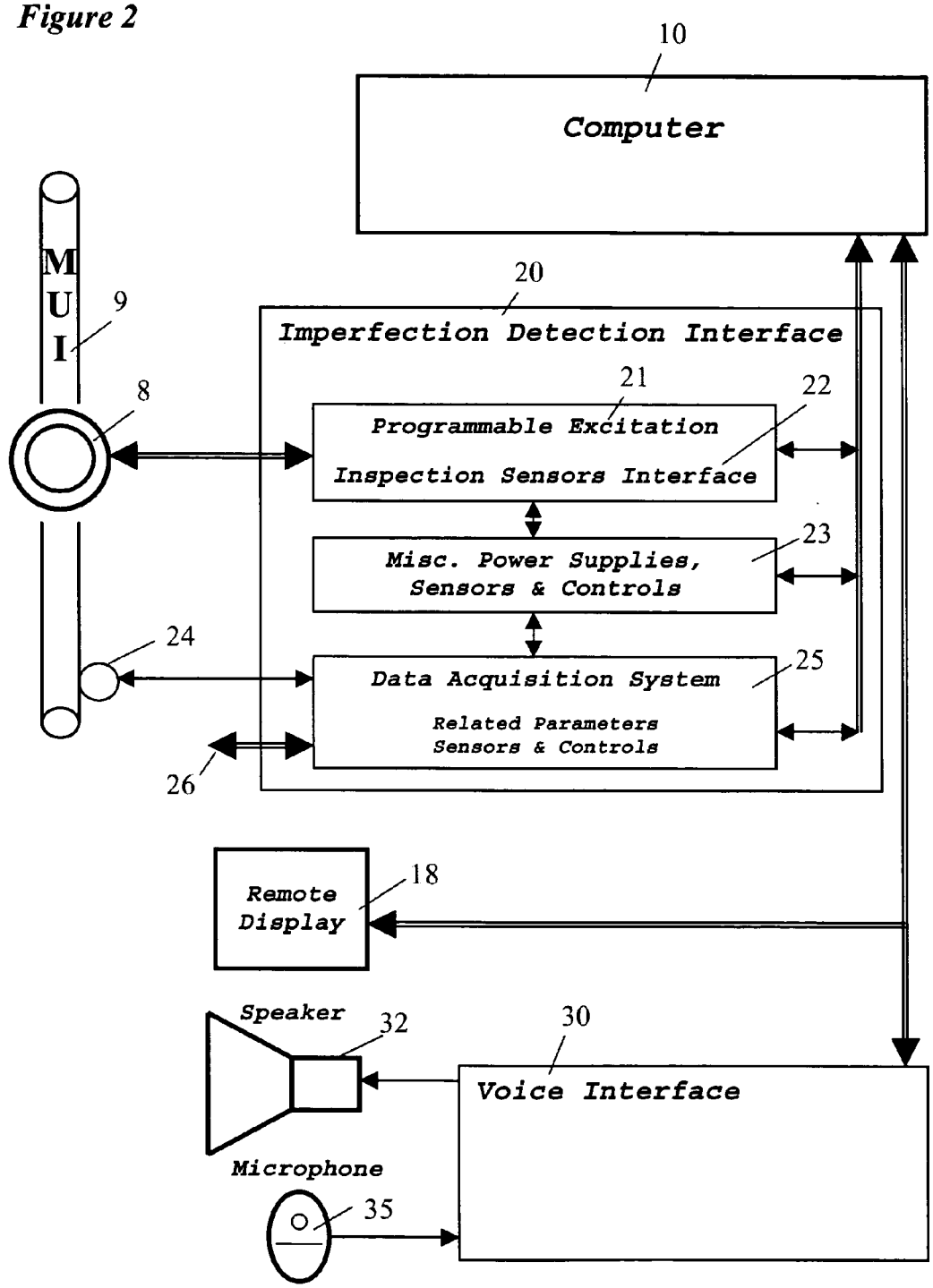
FIG. 2 is a block diagram of a voice enabled inspection computer and imperfection detection interface.

FIG. 2 is a block diagram of the inspection computer 10 the voice interface engine 30 and the imperfection detection interface 20 and further illustrates the preferable information exchange among the components of the inspection equipment. The NDI industry has utilized a variety of techniques and devices with the majority based on the well known and well documented techniques of magnetic flux leakage, magnetic particle, eddy-current, ultrasonic, radiation, such as x-ray and gamma ray, dye penetrant, and dimensional as well as visual and audible techniques. These techniques have been utilized alone or in combination with each other to address the specifics of the MUI 9.

Regardless of the specific technique utilized, a function of the imperfection detection interface 20 is to generate and induce excitation 21 into the MUI 9 and detect its response to the excitation 21. Preferably, at least one inspection head 8 is mounted on or inserted in the MUI 9 and it may be stationary or travel along the MUI 9. It should be appreciated that the inspection head 8 can be applied to the inside as well as the outside of the MUI 9. It should be understood that the inspection head 8, illustrated herein, may comprise at least one excitation inducer 21 and one or more inspection sensors mounted such that the inspection needs of MUI 9 are substantially covered including, when required, the use of more than one inspection head 8. It should be further understood that when more than one inspection head 8 is employed, more than one excitation inducer 21 and sensor interface 22 may also be employed. Still further, it should be understood that the inspection head 8 may implement more than one inspection technique such that the inspection needs of MUI 9 are substantially covered. The inspection computer 10 preferably both programs and controls the excitation 21 and the inspection head 8 as well as receives data from the inspection head 8 sensors. The inspection head 8, excitation 21, and the inspection sensor interface 22 may be combined within the same physical housing.

The inspection head 8 relates data information, such as, but not limited to, echo, reluctance, resistance, impedance, absorption, attenuation, or other physical parameters that may or may not represent an imperfection of the MUI 9. Therefore, it becomes the focus of the inspector to interpret these signals, select the ones that may be pertinent, decide the disposition of the MUI 9, and direct any further action. Preferably, computerized inspection equipment presents these signals on a colorful computer screen instead of the traditional meters and chart recorders.

Computer 10 also controls and monitors a plurality of power supplies, sensors and controls 23 that facilitate the inspection process including but not limited to safety features. Further, computer 10 monitors/controls the data acquisition system 25 which preferably assimilates data from sensor 24. Sensor 24 preferably provides data such as, but not limited to, pipe location (feet of pipe passing through the inspection head 8) and penetration rate (speed of pipe moving through the inspection head 8). It should be appreciated that the data to be acquired will vary with the specific type of MUI 9 and thus the same parameters are not always measured/detected. Furthermore and in addition to the aforementioned inspection techniques, computer 10 may also monitor, through the data acquisition system 25, parameters that are related to the inspection or utilization of the MUI 9, such as, including but not limited, to the MUI 9 internal pressure, external pressure, such as the wellhead pressure, temperature, flow rate, tension, weight, load distribution, etc. Preferably, these parameters are measured or acquired through sensors and transducers mounted throughout the inspection area, such as a rig. For ease of understanding, these various sensors and transducers are designated with the numeral 26 in FIG. 2. The STYLWAN Rig Data Integration System (RDIS-10) is an example of such an inspection system.

Inspection of the MUI 9 may be carried out on location, such as a wellsite, a chemical plant or refinery, an airport tarmac or a bridge, may be carried out at a storage yard or facility, at a manufacturing facility, such as a pipe mill, and in general in a noisy industrial environment. Inspection rarely takes place in a laboratory where typical sound levels, similar to a bank lobby, may be in the range of 40 db to 50 db while factory or industrial sound levels may exceed 80 db. A frequency bandwidth of substantially 300 Hz to 2500 Hz and a dynamic range of substantially 40 db may be adequate for good quality speech with good quality listenability and intelligibility. Industrial noise may also be present in the same frequency range. The notch filters 37 (FIG. 1) may be "parked" outside of this frequency range or bypassed altogether when the noise level is acceptable. When a machine, a jet engine, or other device starts suddenly, the notch filters 37 would preferably sweep to match the predominant noise frequencies. The notch filters 37 may be activated either manually or through a fast tracking digital signal processing algorithm. Narrow notch filters 37 with a substantially 40 db rejection are known in the art and can thus be readily designed and implemented by those skilled in the art. Furthermore, it should be understood that standard noise cancellation techniques could also be applied to the output of the sound synthesizer 33 and the speech synthesizer 34 when the speaker 32 comprises a set of earphones such as in a headset.

The inspector may remain in communication with the inspection equipment in a variety of conventional ways. Several examples, which are not intended as limiting, of possible ways of such communication are: being tethered to the inspection equipment with a cable; being connected to the inspection equipment through a network of sockets distributed throughout an inspection facility including the inspection head(s); being connected to the inspection equipment through an optical link (tethered or not); or being connected to the inspection equipment through a radio link. This frees the inspector to move around and focus his/her attention wherever needed without interfering with the production rate of the inspection process. However, a major obstacle for the voice recognition is recognition under adversity, i.e. in noisy environments.

Voice Recognition Engines (VRE) and Text to Speech (TTS) products are commercially available (both in hardware form and in software) and their use is widespread throughout everyday activities such as operators in the telecommunications industry where, more often than not, the telephone operators have been replaced by voice interaction systems. Typically, these systems recite a fixed menu; however, they may be called upon to recognize voice commands from a caller without prior training to the voice characteristics of that particular caller. Further, the commands may be selected to allow easy recognition. However, only large scale computing systems can fulfill these diverse voice recognition requirements.

Voice to text adaptation, for word processors, is another widespread commercial application. Commercially available products convert voice messages to text. Such systems are typically fine-tuned to the voice characteristics of the specific operator through a training regiment, in a noise free environment, that may last many hours. An example of such a training regime is that the computer instructs the operator to eliminate all noise sources and then displays a paragraph of text and the operator is asked to read the text. When certain words are not recognized, the computer instructs the operator to repeat those words over and over again and upon multiple failures the computer instructs the operator to move to a quiet environment and try again. Thus, the computer is tuned to specific voice characteristics in a quiet environment. Further, there are many other commercially available small scale voice recognition systems, sound recognition systems, and text to speech systems adept for specific tasks, such as tools for the disabled, educational tools, speaking toys, and toys that respond to voice commands.

However, none of the above described systems or tools are tuned for operation in the diverse industrial environment of non-destructive inspection. For example, while inspecting an aircraft wing a nearby aircraft may start its jet engines. This could disable a voice recognition engine by either causing the voice interface to continue asking for the last command or by saturating its input stage. Typically, adversity in a telephone system, which may be caused by noise, interference, or other interruption of voice recognition, is resolved by forwarding the call to an operator, usually after several failed attempts to recognize a command. For an inspection system, particularly in a field application, this is not an option. Similar problems may be encountered in an inspection facility when a nearby air compressor suddenly starts up; at a well site when the rig engine is revving up, or during a bridge inspection while traffic is crossing it. It is usually not cost effective for these activities to be stopped to accommodate the inspection or to be modified to fit the inspection needs.

Commercially, these types of problems have been addressed in various ways, including the use of directional microphones, local adjustments, or press-to-talk schemes (such as VOX). However, all of these commercial solutions are aimed at human-to-human communications and have been inadequate for the purposes on non-destructive inspections in noisy or otherwise adverse environments. Another solution for adverse environments was implemented for open canopy aviation. In this application, sound from the larynx was captured through the use of wearable microphones in contact with the pilot's larynx. Further, wearable arrays of microphones embedded inside the inspector's hardhat or eye protection coupled with standard noise cancellation techniques can possibly solve these problems; however, theses techniques again are aimed at human-to-human communications, they are expensive to implement and unfit for the inspection task as they primarily provide a small improvement and rely upon the superb human abilities to comprehend the message and filter out the remaining noise. Thus, the present invention preferably provides an adaptable and inexpensive man to machine interface to substantially minimize these types of problems.

It should be appreciated that the present invention may be a small scale voice recognition system specifically designed to verify the identity of the inspector or authorized operator, to recognize commands under adverse conditions, to aid the inspector in this interaction, to act according to the commands in a substantially safe fashion, and to keep the inspector informed of the actions, the progress, and the status of the inspection process.

Text to speech is highly advanced and may be implemented without great difficulty. Preferably, when utilizing text to speech, the inspection unit can readily recite its status utilizing, but not limited to, such phrases as: "magnetizer on"; "chart out of paper", and "low battery". It can recite the progress of the inspection utilizing, but not limited to, such phrases as: "MUI stopped"; "MUI speed too slow"; and "four thousand feet down, six thousand to go". It can recite inspection readings utilizing, but not limited to, such phrases as "wall loss", "ninety six", "loss of echo", "ouch", or other possible code words to indicate a rejection. The inspector would not even have to look at a watch as simple voice commands like "time" and "date" would preferably recite the inspection equipment clock and/or calendar utilizing, but not limited to, such phrases as "ten thirty two am", or "Monday April eleven".

Operation

Referring to FIGS. 1 and 2, computer 10 may comprise two separate physical computers, a high-speed digital signal processor (herein after referred to as "DSP") coupled through a communication link with a commercially available PC. Preferably, the DSP directly controls, monitors, receives, and processes data from the imperfection detection interface 20 while the PC primarily provides the operator interface and storage. Such an exemplary inspection unit is the STYLWAN RDIS-10.

In a Coiled Tubing configuration, an inspection unit, such as, but not limited to, the STYLWAN RDIS-10 DSP, adjusts and monitors the magnetizing power supply that provides the inspection excitation 21 by driving at least one magnetizing coil inside the inspection head 8; reads and processes the signals from the inspection sensor interface 22; reads and processes the inspection head 8 temperature and adjusts the inspection excitation 21 and the sensor signals accordingly; reads the tubing speed and direction 24; calculates the location of the tubing inside the inspection head 8; reads, monitors, and processes the internal pressure of the tubing, the wellhead pressure and the weight of the tubing hanging in the well; and reads, monitors, and processes the flow rate of the fluid pumped through the tubing and calculates the volume of the fluid pumped. It should be appreciated, that not all DSP functions need to be employed in all inspection scenarios and a complete MUI inspection may be performed with the DSP adjusting and monitoring the magnetizing power supply that provides the inspection excitation 21 and reading and processing the signals from the inspection sensor interface 22.

It should further be appreciated, that not all commands need to be employed in all inspection scenarios as some may be limited by the application, the processor speed, or the available memory. For example, the inspection unit DSP may implement the minimum number of commands while the PC may implement a wider spectrum of commands. It should be understood that implementing the minimum number of commands would preferably result in the most efficient use of resources and the highest recognition success. Preferably, when utilizing the voice interface, commands to the system will be spoken commands by the inspector as opposed to commands which are executed by the manual depression of keyboard keys, typing the commands, or utilizing switches.

Preferably, the operational commands may be direct words such as, but not limited to, "on", "off", "up", "down", "fast", "slow", "forward", "back", and other descriptive words. However, it should be further appreciated that less obvious commands might be selected to further enhance the security of the voiceprint recognition. Preferably, such commands may be used during the inspection equipment setting or calibration so as to prevent programming improper or inoperable function. An example, not intended to be limiting, the imperfection detection system gain may be adjusted by commands such as "fall", "summer" and "winter". A plain verbal command may provide a given gain value, for example "gain twenty three" or the equivalent code phrase "twenty three fall" may accomplish the exact same result. The inspection unit may then be programmed to respond back to the inspector by confirming the gain setting or another confirmation that the command was accepted such as a beep, a tune, or a verbal response such as, but not limited to, "gain set" or even "aye aye sir". It should be further understood that a variety of words may be programmed as particular commands and thus "code" words can easily be implemented for security and plain language commands would preferably be programmed for the normal operational commands.

Preferably, the spoken command "up" or "down" will increase or decrease the gain, respectively by a pre-determined amount such as a single digital step. Similarly the code words "summer" and "winter" would have a similar but more secure effect. Preferably, gain increases and/or decreases in increments greater than a single digital step are initiated with spoken commands such as, but not limited to, "ten up" or "ten down" or the code phrases "ten summer" or "ten winter" which will increase or decrease the gain, respectfully, in substantially ten digital steps. Preferably, after a certain pre-determined time period (preferably about three (3) seconds), if no other command is given, the inspection unit will report back to the inspector the set value of the imperfection detection system gain.

In a manual operating mode, a pre-determined key may be depressed to preferably toggle the inspection data save mode cycles between on and off. However, typically a valid filename must be entered into the PC, such as into a file menu, prior to initiating a save mode. When utilizing the voice interface, spoken commands, such as "save" will preferably cycle or toggle the inspection data save mode between on and off. It should be appreciated that more complex programming and commands will preferably allow spoken commands such as, but hot limited to "save on" or "save off" to turn on or off, respectively, the inspection data save mode. In such an embodiment, the inspection data save mode will preferably not toggle between on and off but will rather enter the specific mode as verbally commanded by the inspector. The inspection unit may then be programmed to respond back to the inspector with such phrases including, but not limited to, "save on" and "save off". Preferably, if the inspection data save mode data cannot be activated because of a missing filename, the inspection unit will prompt the inspector with a phrase such as, but not limited to, "no filename" or "filename missing" with the help menu (further described herein below) providing further assistance.

To start an inspection, the inspector preferably initiates an automatic reference cycle with a spoken command such as, but not limited to, "reference". Preferably the reference cycle will last some pre-determined time period such as approximately five (5) seconds. However, the speed of the reference cycle may be dependent on the sophistication of the reference data as well as the sophistication of the computerized equipment. Preferably, the inspection unit will respond back, to the inspector, with a phrase such as, but not limited to "reference in progress". Preferably after the reference cycle has completed, such as after the approximate five (5) seconds or other desired or specified cycle time, the inspection unit may be programmed to respond with a phrase such as, but not limited to "pause" or "reference completed". This could be further accompanied by or followed by a slow beeping sound or some melody to indicate an idle mode.

Preferably, the inspector may control the inspection process with the plain language or self-explanatory spoken commands such as, but not limited to, "start", "pause" and "stop". It should be understood, that the use of code words for certain commands, such as "start", may be programmed particularly when safety and/or security is an issue and it is particularly desired to function in a voice recognition mode. During the inspection process, spoken commands such as, but not limited to, "start" or "start traces" may preferably initiate the inspection traces to be converted to sound, including comments, to keep the inspector more fully apprized of the details of the inspection process while away from the inspection console and the typical inspection equipment readout instruments.

In an embodiment where the movement of either the inspection head 8, the MUI 9, or both is motor driven, the spoken commands which initiate the inspection mode of the inspection unit would preferably control the default mode of the motor drive. The inspector may further control the motor drive with the plain language or self-explanatory spoken commands such as, but not limited to "slow", "fast", "speed (value)", "forward", "reverse", and "halt". The inspection unit can further be programmed to acknowledge the control command by responding to the inspector that the motor has sped up or slowed down, that it is moving forward or backward, that it has stopped, or provide a particular speed setting. It should be understood that motor drive, as used herein, includes, but is not limited to, other drive means such as hydraulic, pneumatic, electric, or a combination thereof.

Each pre-selected variable of the MUI 9 may be examined by individual spoken commands such as, but not limited to, "pump", "wellhead", "weight", "pipe", "wall", or "flaw". Preferably, the inspection unit will respond with an answer such as, but not limited to "pump pressure five thousand nine hundred fifty" or "flaw thirty two".

Further, pre-determined alarm set points may be programmed for each of the pre-selected MUI variables. Preferably, these set points may be entered by spoken commands by naming each variable and providing the value for the alarm set point. Examples include, but are not limited to, "pumpset (value)", "wellset (value)", "weightset (value)", "wallset (value)", and "flawset (value)". Preferably, the inspection unit will be programmed to respond, to each setting, by naming the particular variable and stating the set point such as, but not limited to, the phrase "wellhead pressure alarm three thousand". The inspector will preferably be able to examine the status of the inspection unit by spoken commands, such as but not limited to, "status". Preferably, the inspection unit will respond back to the inspector with a spoken response combining all the currently utilized attributes. An example may include, but is not limited to, the following: "idle", "pause", "scanning", "save on", "save off", "gain (value)", "threshold (value)", "pump alarm (value)", "wellhead alarm (value)", "weight alarm (value)", "pipe location (value)", and "pipe retrieve at (value)".

Preferably, the inspection unit will be complete with a voice interface activated Help menu. Such Help menu may be accessed by a spoken command such as, but not limited to, "help". Preferably, the inspection unit will be programmed to respond that the Help menu has been accessed and verbally prompt the inspector through the help menu thus allowing the inspector to further access other commands.

When the inspection process is complete or needs to be concluded for any variety of reasons, a spoken command such as, but not limited to, "exit" would preferably terminate all active commands. It should be appreciated that although any word may be used to terminate all active commands, this word should differ from other command words to ensure against inadvertent shut down. Further, the spoken command for the termination of all active commands may be some pre-selected code word and may require voiceprint positive identification prior to being carried out.

It should be appreciated, as discussed herein above, that the speech synthesizer 34, the sound synthesizer 33, and the speech recognition engine 38 are commercially available. A variety of software and manuals are available from, but not limited to such sources as Texas Instruments, ViaVoice, Dragon Speak Naturally, as well as U.S. Pat. Nos. 4,209,836 and U.S. Pat. No. 4,158,749. It should further be appreciated that each of these sources and combinations thereof can enable, one skilled in the art, to implement the voice interface 30 described herein without undue experimentation. However, it should be understood that because of the preference for a small scale system, which utilizes a limited vocabulary of key words, the system will not be plagued by the memory limitations of large systems and can therefore utilize higher spectral resolution than commercially available systems. For example, ViaVoice by IBM utilizes a 300,000 English word vocabulary and requires 500 MB of disk space so compression of data is mandatory. It should be further appreciated that such large scale systems, such as ViaVoice by IBM, could require extensive pre-processing to compensate for the speed or pronunciation of words or phrases (utterances) since such an extensive vocabulary would only allow for a particular word to only be coded in a specific manner. Whereas, a small scale system, such as the instant invention, allows for utilizing variable coding for the same word or phrase thus substantially reducing any preprocessing time and memory for processing words or phrases which may vary due to the speed of the utterance or the pronunciation of the utterance. It should be further appreciated that when utilizing voiceprint technology, more extensive and detailed information must be stored to identify a specific speaker and thus, the speaker's particular utterance pattern. However, when utilizing a small scale system, such utterance patterns can be easily stored and thus processed without the requirement of significant storage and processing capability.

Figure 3:
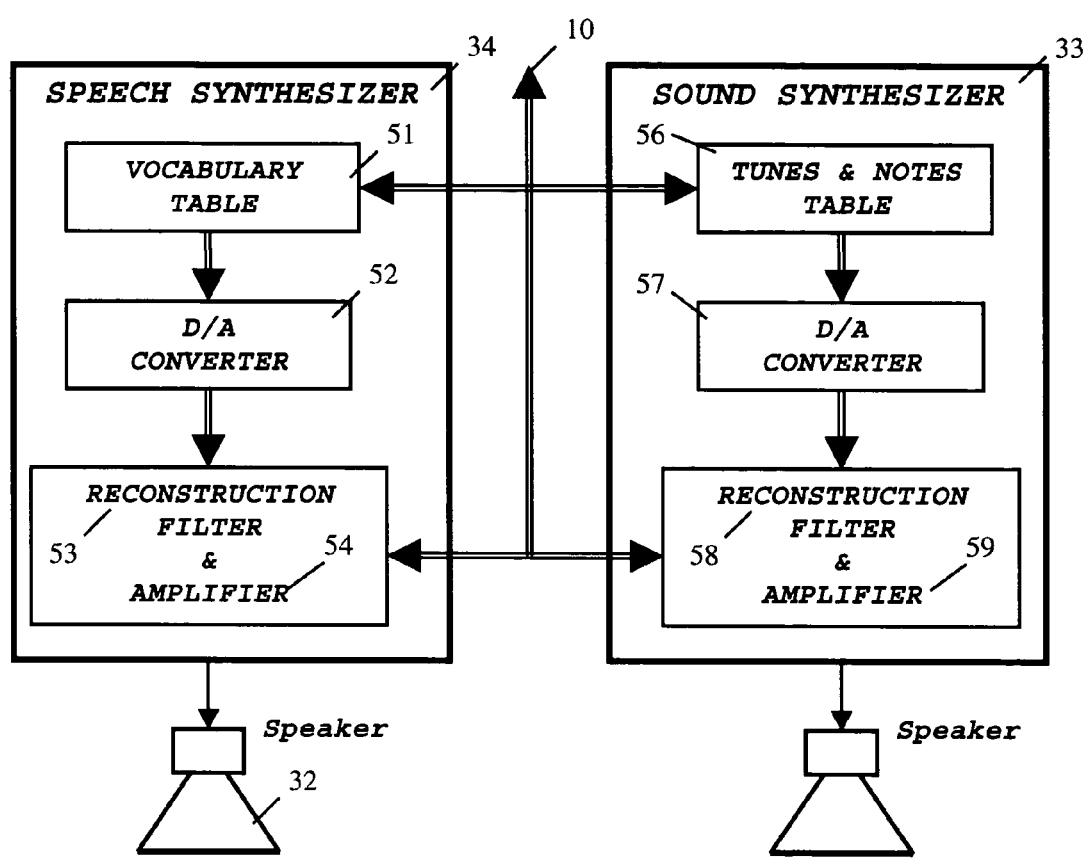
FIG. 3 is a block diagram of a speech synthesizer and a sound synthesizer.
Figure 4:
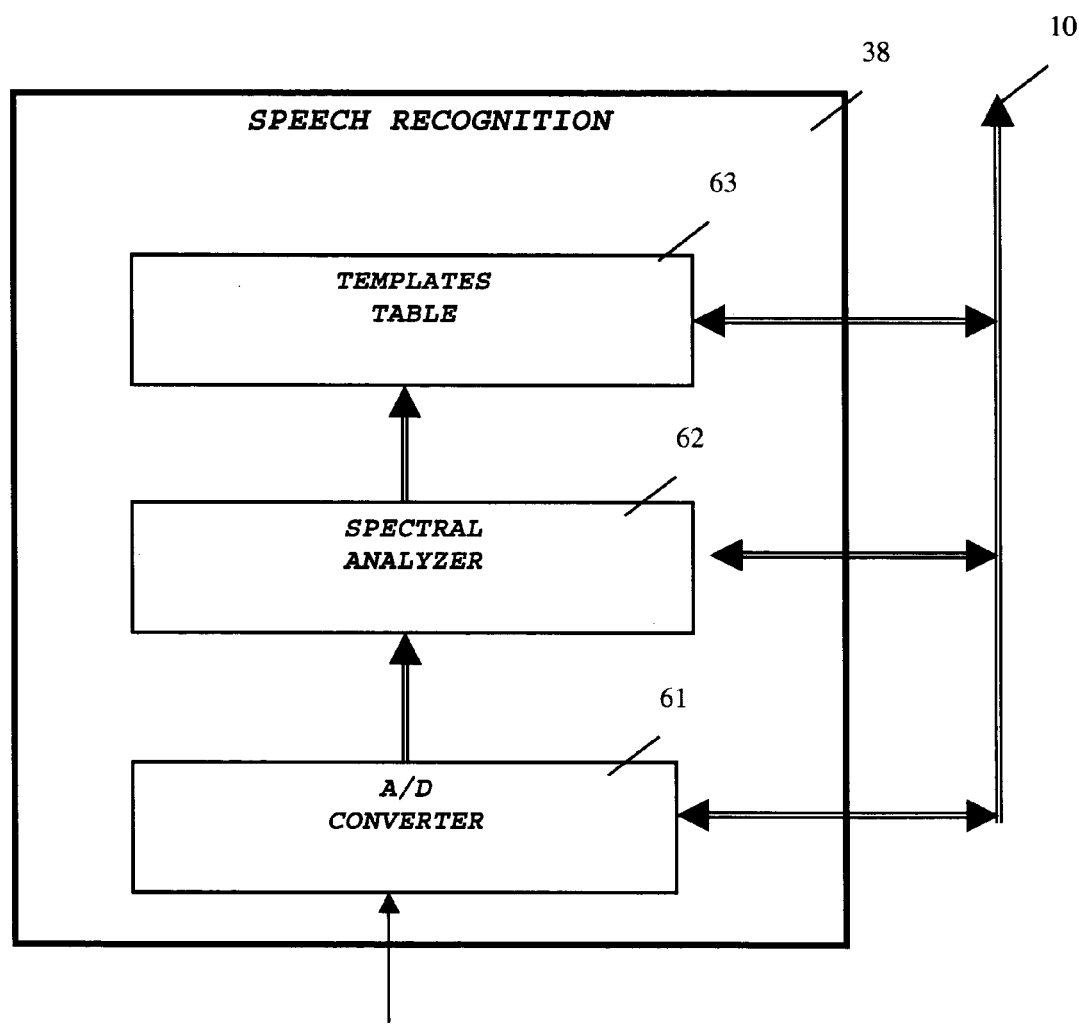
FIG. 4 is a block diagram of a speech recognition engine.

FIGS. 3 and 4 illustrate a block diagram of a preferred speech synthesizer 34, sound synthesizer 33, and speech recognition engine 38. It should be understood that these embodiments should not be viewed as limiting and may be tailored to specific inspection constraints and requirements.

Referring now to FIG. 3, the speech synthesizer 34 and the sound synthesizer 33 may comprise a vocabulary table 51 and a tunes and notes table 56, respectively. The digital-to-analog (herein after referred to as "D/A") converter 52, 57, the reconstruction filter 53, 58, and the variable gain output amplifier 54, 59 are in communication with computer 10. The vocabulary table 51 and the tunes and notes table 56 may be implemented in a read only memory (ROM) or any other storage device. The computer 10 preferably sequences through the entire address sequence so that the complete digital data of the utterance (word, phrase, melody, tune, or sound), properly spaced in time, are converted to an analog signal through the D/A 52, 57. The analog signal is then preferably bandlimited by the reconstruction filter 53, 58, amplified by the amplifier 54, 59, and sent to the speaker 32. Preferably, the computer 10 can vary the bandwidth of the reconstruction filter 53, 58 and adjust the gain of the amplifier 54, 59. In a different embodiment, the gain of the amplifier 54, 59 may be carried out manually by the operator.

It should be understood that the vocabulary table 51 and the tunes and notes table 56 may incorporate a built in sequencer with the computer 10 providing the starting address of the utterance (word, phrase, melody, tune, or sound). It should be further understood that the speech synthesizer 34 and the sound synthesizer 33 may comprise separate devices, such as the YAMAHA part number YM2413B, may be included in the same device, such as the YAMAHA part number YMZ705, may be part of a complete sound and video system, such as the YAMAHA part number 4MF743A40, or even be combined into one device, the speech and sound synthesizer, such as the YAMAHA part number YM2413B. It should be understood that an utterance may comprise of a word, a short phrase and/or sound effects such as melodies, tunes and notes. A variable length of silence may be part of the utterance, which may or may not be part of the vocabulary table 51 and/or the tunes and notes table 56 in order to save storage space. Instead, the length of the silence may be coded in the vocabulary table 51 and/or the tunes and notes table 56. The silence can then be produced through a variable delay routine in the computer 10.

Referring now to FIG. 4, the speech recognition engine 38, may comprise an analog-to-digital (herein after referred to as "A/D") converter 61, a spectral analyzer 62, and the voice templates table 63 which may be implemented in a read only memory (ROM) or any other storage device. The description of the sequence of software steps (math, processing, etc.) is well known in the art, such as can be found in Texas Instruments applications, and will not be described in detail herein. An exemplary hardware device is the YAMAHA part number 4MF743A40, which provides most of the building blocks for the entire system.

Voiceprint speaker verification is preferably carried out using a small template, of a few critical commands, and would preferably be a separate section of the templates table 63. Different speakers may implement different commands, all performing the same overall function. For example "start now" and "let's go" may be commands that carry out the same function, but are assigned to different speakers in order to enhance the speaker recognition success and improve security. As discussed herein above, code words can be used as commands. The commands would preferably be chosen to be multi-syllabic to reduce the likelihood of false triggers. Commands with 3 to 5 syllables are preferred but are not required.

It may be seen from the preceding description that a novel inspection system with voice interaction and control has been provided. Although specific examples may have been described and disclosed, the invention of the instant application is considered to comprise and is intended to comprise any equivalent structure and may be constructed in many different ways to function and operate in the general manner as explained hereinbefore. Accordingly, it is noted that the embodiments described herein in detail for exemplary purposes are of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. An inspection system interacting with a voice interface through speech and hearing comprising:

at least one imperfection detection sensor with an output;

at least one computer having at least one imperfection detection interface, wherein said output is in communication with the computer, and wherein said at least one computer controls the induction of an excitation into a material being inspected and detects a response from the material, to the induced excitation, with said at least one imperfection detection sensor, and wherein said at least one computer converts said response into an inspection trace; and at least one sound synthesizer, the computer being in data communication with said at least one sound synthesizer, wherein said inspection trace is communicated to said at least one sound synthesizer, and wherein the sound synthesizer produces, through psychoacoustic modeling, controlled by said at least one computer, audible sound identifying said inspection trace.

2. The inspection system of claim 1, further comprising at least one speaker, wherein said at least one speaker is in communication with the sound synthesizer and allows a sound output to emanate from the sound synthesizer.

3. The inspection system of claim 2, further comprising a headset, wherein said headset comprises said at least one speaker.

4. The inspection system of claim 1, further comprising an inspection unit, the unit being disposed about an element being inspected and in communication with said at least one imperfection detection interface.

5. The inspection system of claim 1, further comprising at least one remote display, wherein said at least one remote display being portable.

6. The inspection system of claim 5, wherein said at least one remote display is carried on a headset.

7. The inspection system of claim 1, further comprising:
storage for the computer; and
inspection results, wherein said inspection results may be stored in said storage.

8. The inspection system of claim 1, wherein said inspection system can be adapted to operate a data acquisition system.

9. An inspection system interacting with a voice interface through speech and hearing comprising:

at least one imperfection detection sensor with an output;

at least one computer having at least one imperfection detection interface, wherein said output is in communication with the computer, and wherein said at least one computer controls the induction of an excitation into a material being inspected and detects a response from the material, to the induced excitation, with said at least one imperfection detection sensor, and wherein said at least one computer converts said response into inspection trace; and at least one speech synthesizer, the computer being in data communication with said at least one speech synthesizer, wherein said inspection trace is communicated to said at least one speech synthesizer, and wherein the speech synthesizer produces, through psychoacoustic modeling, controlled by said at least one computer, recognizable speech describing said inspection trace.

10. The inspection system of claim 9, further comprising at least one language selector, wherein the speech synthesizer produces voice output in more than one language.

11. The inspection system of claim 9, further comprising at least one speaker, wherein said at least one speaker allows a speech output to emanate from the speech synthesizer.

12. The inspection system of claim 11, further comprising a headset, wherein said headset comprises said at least one speaker.

13. The inspection system of claim 9, further comprising an inspection unit, the unit being disposed about an element being inspected and in communication with said at least one imperfection detection interface.

14. The inspection system of claim 9, further comprising at least one remote display; wherein said at least one remote display is portable.

15. The inspection system of claim 14, wherein said at least one remote display is carried on a headset.

16. The inspection system of claim 9, further comprising:
storage for the computer; and
inspection results, wherein said inspection results may be stored in said storage.

17. The inspection system of claim 9, wherein said inspection system can be adapted to operate a data acquisition system.

18. An inspection system interacting with a voice interface through speech and hearing comprising:

at least one imperfection detection sensor with an output;

at least one computer having at least one imperfection detection interface, wherein said output is in communication with the computer; and at least one speech recognition engine, the computer being in data communication with said at least one speech recognition engine, wherein the speech recognition engine accepts and recognizes a voice input.

19. The inspection system of claim 18, further comprising at least one language selector, wherein the speech recognition engine may accept and recognize more than one language.

20. The inspection system of claim 18, further comprising an automatic language selector, wherein the speech recognition engine may automatically accept and recognize more than one language.

21. The inspection system of claim 18, further comprising an automatic language selector, wherein the speech recognition engine may automatically and substantially simultaneously recognize more than one language.

22. The inspection system of claim 18, further comprising voiceprint identification capability to recognize at least one speaker.

23. The inspection system of claim 18, further comprising:
at least one electroacoustic device, wherein said at least one electroacoustic device receives sound input from at least one source; and
at least one device capable of increasing sound magnitude for receiving a sound input.

24. The inspection system of claim 23, wherein said at least one source is an inspector.

25. The inspection system of claim 18, further comprising at least one band-rejection filter, wherein said at least one band-rejection filter suppresses interference.

26. The inspection system of claim 18, further comprising a headset, wherein said headset comprises said at least one electroacoustic device, wherein said at least one electroacoustic device receives sound input from at least one source.

27. The inspection system of claim 18, further comprising an inspection unit, the unit being disposed about an element being inspected and in communication with said at least one imperfection detection interface.

28. The inspection system of claim 18, further comprising at least one remote display, wherein said at least one remote display is portable.

29. The inspection system of claim 28, wherein said at least one remote display is carried on a headset.

30. The inspection system of claim 18, further comprising:
storage for the computer; and
inspection results, wherein said inspection results may be stored in said storage.

31. The inspection system of claim 18, wherein said inspection system can be adapted to operate a data acquisition system.

32. The inspection system of claim 18, further comprising:
at least one speech synthesizer, the computer being in data communication with said at least one speech synthesizer, wherein the speech synthesizer produces a voice output; and
at least one sound synthesizer, the computer being in data communication with said at least one sound synthesizer wherein the sound synthesizer produces audible sound output.

33. The inspection system of claim 32, further comprising a language selector, wherein the speech synthesizer produces voice output in more than one language.

34. The inspection system of claim 32, further comprising at least one speaker, wherein said at least one speaker allows a voice output to emanate from the speech synthesizer.

35. The inspection system of claim 32, further comprising at least one speaker, wherein said at least one speaker allows an audible sound output to emanate from the sound synthesizer.

36. The inspection system of claim 32, further comprising at least one speaker, wherein said at least one speaker allows a voice output to emanate from the speech synthesizer and allows an audible sound output to emanate from the sound synthesizer.

37. The inspection system of claim 32, further comprising a headset, wherein said headset comprises at least one electroacoustic device and at least one speaker.

38. The inspection system of claim 18, further comprising a help menu.

39. A method of operating an inspection system with a voice interface comprising the steps of:
establishing communication between at least one sound synthesizer and at least one computer;
operating an imperfection detection sensor, wherein said at least one computer controls the induction of an excitation into a material being inspected and detects an inspection trace from the material, to the induced excitation, with said at least one imperfection detection sensor, wherein the detection sensor emits an electronic signal characterizing said inspection trace;
converting the electronic signal into a digital signal;
sending an output digital signal from said at least one computer to the sound synthesizer;
using psychoacoustic modeling, controlled by said at least one computer, to convert said output digital signal to an audible sound identifying said inspection trace; and
broadcasting said audible sound through a speaker.

40. The method of claim 39, further comprising the step of connecting a data acquisition system to the computer and operating said data acquisition system with the computer.

41. The method of claim 39, further comprising the steps of:
establishing communication between at least one speech recognition engine and the computer;
speaking a command into at least one electroacoustic device, wherein said at least one electroacoustic device receives sound input from at least one source, and wherein said at least one electroacoustic device is in communication with the speech recognition engine;
converting said spoken command into a digital signal; and
inputting the converted digital signal into the computer, wherein the converted digital signal executes a command in the computer.

42. A method of claim 41, further comprising the step of enabling voiceprint identification capability by the computer.

43. The method of claim 39, further comprising the steps of:
establishing communication between at least one speech synthesizer and the computer;
sending an output digital signal from the computer to the speech synthesizer;
converting said output digital signal to a vocal response; and
broadcasting the vocal sound response through a speaker.

44. A method of operating an inspection system with a voice interface comprising the steps of:
establishing communication between at least one speech synthesizer and at least one computer;
operating an imperfection detection sensor, wherein said at least one computer controls the induction of an excitation into a material being inspected and detects an inspection trace from the material, to the induced excitation, with said at least one imperfection detection sensor, wherein the detection sensor emits an electronic signal characterizing said inspection trace;
converting said electronic signal into a digital signal;
sending an output digital signal from said at least one computer to the speech synthesizer;
using psychoacoustic modeling, controlled by said at least one computer, to convert said output digital signal to a recognizable speech response describing said inspection trace; and
broadcasting said recognizable speech response through a speaker.

45. The method of claim 44, further comprising the step of connecting a data acquisition system to the computer and operating said data acquisition system with the computer.

46. The method of claim 44, further comprising the steps of:
establishing communication between at least one speech recognition engine and the computer;
speaking a command into at least one electroacoustic device, wherein said at least one electroacoustic device receives sound input from at least one source, and wherein said at least one electroacoustic device is in communication with the speech recognition engine;
converting said spoken command into a digital signal; and
inputting the converted digital signal into the computer, wherein the converted digital signal executes a command in the computer.

47. A method of claim 46, further comprising the step of enabling voiceprint identification capability by the computer.

48. The method of claim 44, further comprising the steps of:
establishing communication between at least one sound synthesizer and the computer;
sending an output digital signal from the computer to the sound synthesizer;
converting said output digital signal to an audible sound response; and broadcasting the audible sound response through a speaker.

49. A method of operating an inspection system with a voice interface comprising the steps of:
   establishing communication between at least one speech recognition engine and at least one computer;
   operating an imperfection detection sensor, wherein the detection sensor emits an electronic signal regarding an element to be inspected;
   converting the electronic signal into a digital signal;
   inputting the converted digital signal into the computer,
   speaking a command into at least one electroacoustic device, wherein said at least one electroacoustic device receives sound input from at least one source, and wherein said at least one electroacoustic device is in communication with the speech recognition engine;
   converting said spoken command into a digital signal; and
   inputting the converted digital signal into the computer, wherein the converted digital signal executes a command in the computer.

50. The method of claim 49, further comprising the step of connecting a data acquisition system to the computer and operating said data acquisition system with the computer.

51. The method of claim 49, further comprising the steps of:
   establishing communication between at least one speech synthesizer and the computer;
   sending an output digital signal from the computer to the speech synthesizer;
   converting said output digital signal to a vocal response; and
   broadcasting said vocal response through a speaker.

52. A method of claim 49, further comprising the step of enabling voiceprint identification capability by the computer.

53. The method of claim 49, further comprising the steps of:
   establishing communication between at least one sound synthesizer and the computer;
   sending an output digital signal from the computer to the sound synthesizer;
   converting said output digital signal to an audible sound response; and
   broadcasting said audible sound through a speaker.

* * * * *